(12) United States Patent
Nagami

(10) Patent No.: US 9,329,444 B2
(45) Date of Patent: May 3, 2016

(54) LIQUID CRYSTAL DISPLAY DEVICE

(71) Applicant: Japan Display Inc., Tokyo (JP)

(72) Inventor: Takahiro Nagami, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/533,591

(22) Filed: Nov. 5, 2014

(65) Prior Publication Data

US 2015/0055038 A1 Feb. 26, 2015

Related U.S. Application Data

(63) Continuation of application No. 13/251,384, filed on Oct. 3, 2011, now Pat. No. 8,908,114.

(30) Foreign Application Priority Data

Oct. 5, 2010 (JP) ................. 2010-225632

(51) Int. Cl.
*G02F 1/1362* (2006.01)
*G02F 1/1343* (2006.01)
*G02F 1/1333* (2006.01)
*G02F 1/1368* (2006.01)

(52) U.S. Cl.
CPC ........ *G02F 1/134363* (2013.01); *G02F 1/1368* (2013.01); *G02F 1/133345* (2013.01); *G02F 1/134309* (2013.01); *G02F 1/136213* (2013.01); *G02F 1/136286* (2013.01); *G02F 1/13624* (2013.01); *G02F 2001/13629* (2013.01); *G02F 2001/134345* (2013.01); *G02F 2001/134372* (2013.01)

(58) Field of Classification Search
CPC .............. G02F 1/136213; G02F 2001/134372; G02F 2001/134345; G02F 2001/134354; G02F 1/13624

USPC .................. 349/39, 52, 138, 38, 141, 144, 48
See application file for complete search history.

(56) References Cited

U.S. PATENT DOCUMENTS

| | | | | |
|---|---|---|---|---|
| 6,459,464 | B1 * | 10/2002 | Nakasima | G02F 1/134363 349/141 |
| 6,693,687 | B2 | 2/2004 | Ohta et al. | |
| 6,704,085 | B2 * | 3/2004 | Nishimura | G02F 1/134363 349/138 |
| 7,084,849 | B2 * | 8/2006 | Noguchi | G09G 3/3614 345/209 |

(Continued)

FOREIGN PATENT DOCUMENTS

| | | |
|---|---|---|
| JP | 2003-207796 | 7/2003 |
| JP | 207-298976 | 11/2007 |
| JP | 2009-168878 | 7/2009 |

*Primary Examiner* — Thanh-Nhan P Nguyen
*Assistant Examiner* — Jia Pan
(74) *Attorney, Agent, or Firm* — TYPHA IP LLC

(57) ABSTRACT

A liquid crystal display device includes a TFT substrate, an opposite substrate, and a liquid crystal between the TFT substrate and the opposite substrate. In the TFT substrate, there are formed in the following order, a first pixel electrode and a second pixel electrode, a first scan line and a second scan line which extend in a first direction and are arranged in a second direction, a first insulating film, a first video signal line and a second video signal line which extend in the second direction and are arranged in the first direction, a second insulating film, and a common electrode. The first pixel electrode and the second pixel electrode are formed in an area surrounded by the first scan line, the second scan line, the first video signal line and the second video signal line.

3 Claims, 11 Drawing Sheets

(56) References Cited

U.S. PATENT DOCUMENTS

| | | | |
|---|---|---|---|
| 7,663,724 B2 | 2/2010 | Lim et al. | |
| 7,796,223 B2 * | 9/2010 | Baek | G02F 1/1368 349/139 |
| 7,915,689 B2 | 3/2011 | Cho et al. | |
| 8,013,970 B2 | 9/2011 | Seo et al. | |
| 8,212,984 B2 | 7/2012 | Kim et al. | |
| 8,218,116 B2 | 7/2012 | Kaneko et al. | |
| 2003/0133053 A1 * | 7/2003 | Ono | G02F 1/136213 349/38 |
| 2004/0061809 A1 * | 4/2004 | Lee | G02F 1/136209 349/43 |
| 2007/0236640 A1 * | 10/2007 | Kimura | G02F 1/134363 349/141 |
| 2008/0094530 A1 | 4/2008 | Ina et al. | |
| 2009/0059110 A1 | 3/2009 | Sasaki et al. | |
| 2009/0180069 A1 | 7/2009 | Nishimura | |
| 2009/0322975 A1 | 12/2009 | Song et al. | |
| 2010/0123843 A1 * | 5/2010 | Kim | G03F 1/36 349/39 |
| 2010/0227442 A1 * | 9/2010 | Lu | H01L 29/66765 438/158 |

* cited by examiner

LIQUID CRYSTAL DISPLAY DEVICE

CROSS REFERENCE TO RELATED APPLICATION

This application is a continuation of U.S. application Ser. No. 13/251,384, filed Oct. 3, 2011, the contents of which are incorporated herein by reference.

CLAIM OF PRIORITY

The present application claims priority from Japanese Patent Application JP 2010-225632 filed on Oct. 5, 2010, the content of which is hereby incorporated by reference into this application.

BACKGROUND OF THE INVENTION

1. Technical Field

The present invention relates to a display device, and more particularly, to an IPS type liquid crystal display device having excellent visibility angle characteristic.

2. Description of Related Art

A liquid crystal display panel used in a liquid crystal display device has a Thin Film Transistor (TFT) substrate, on which pixels each having a pixel electrode and a thin film transistor and the like are formed in matrix, and an opposite substrate facing the TFT substrate, on which color filters and the like are formed in positions corresponding to the pixel electrodes of the TFT substrate, and a liquid crystal held between the TFT substrate and the opposite substrate. An image is formed by controlling light transmittance through a liquid crystal molecule by pixel.

Since the liquid crystal display device is a flat and lightweight device, it is widely used in various fields. A small liquid crystal display device is used in many cellular phones and Digital Still Cameras (DSCs). The liquid crystal display device has a problem in its visibility angle characteristic. The visibility angle characteristic is a phenomenon that the luminance varies or chromaticity varies in accordance with view from front or diagonal direction. The visibility angle characteristic is excellent in In Plane Switching (IPS) method of operating a liquid crystal molecule with a horizontal direction electric field.

Various types of IPS methods exist; however, a main stream method is forming a common electrode or pixel electrodes solidly over a flat surface, arranging comb-shaped pixel electrode or common electrode on the common electrode, with an insulating film therebetween. The liquid crystal molecule is rotated with an electric field which occurs between the pixel electrode and the common electrode. With this method, the transmittance can be increased.

Conventionally, in the above IPS method, first, a TFT is formed, then the TFT is covered with a passivation film, then, the above-described common electrode, the insulating film, the pixel electrodes and the like are formed on the film. However, since there is a requirement for manufacturing cost reduction, the number of layers of the conductor film, the insulating film and the like in the TFT substrate is reduced.

As an example of another IPS method, Japanese Published Unexamined Patent Application No. 2009-168878 discloses forming a common electrode on the same layer of a gate electrode, and forming a comb-shaped pixel electrode, with a gate insulating film and a protective insulating film therebetween.

The pixel electrode is supplied with a video signal via the TFT. To prevent variation of the video signal in accordance with ON/OFF of gate voltage of the TFT, added capacitance is applied. In the conventional IPS, a comb-shaped pixel electrode and the common electrode, in nest relation, are used on the same flat surface. Japanese Published Unexamined Patent Application No. 2003-207796 discloses a structure of such IPS method using a top gate type TFT, in which a common electrode is formed to oppose an n+ region of a TFT semiconductor layer, with an inter-layer insulating film therebetween, with respect to the n+ region of the TFT semiconductor layer, so as to increase the added capacitance.

FIG. 10 is a plan view of an IPS pixel structure of the present invention. In FIG. 10, a pixel is formed in a region surrounded by a main scan line 10 and a video signal line 20. A TFT is formed on the main scan line 10. That is, a semiconductor film 105 is formed via a gate insulating film 103 on the main scan line 10, and a drain electrode 106 and a source electrode 107 are formed on the semiconductor film. The main scan line 10 is also used as a gate electrode. As shown in FIG. 11, in the present pixel structure, a pixel electrode 101 connected to the source electrode 107 of the TFT is formed in the bottom layer, while a common electrode 111 is formed in the top layer, to drive a liquid crystal molecule 200 with a voltage between the pixel electrode 101 and the common electrode 111.

FIG. 11 is a B-B cross sectional view of FIG. 10. In FIG. 11, a gate electrode 102 and the pixel electrode 101 are formed on the glass TFT substrate 100. The gate electrode 102 is an Al and AlMo alloy laminated layer film. The pixel electrode 101 is formed with Indium Tin Oxide (ITO). The gate insulating film 103 is formed so as to cover the gate electrode 102 and the pixel electrode 101.

An e-Si semiconductor film 105 is formed on the gate electrode 102 and the gate insulating film 103, and the drain electrode 106 and the source electrode 107 are formed on the semiconductor film. The source electrode 107 is connected to the pixel electrode 101 via a first through hole 104 formed in the gate insulating film 103. An inorganic passivation film 109 is formed to cover the drain electrode 106 and the source electrode 107. The common electrode 111 is formed on the inorganic passivation film 109. The common electrode 111 has a slit 112. When a voltage is applied between the pixel electrode 101 and the common electrode 111, an electric line of force occurs through the slit 112, to rotate the liquid crystal molecule 200, to control the quantity of light passing through a liquid crystal layer. In this manner, the IPS method, to which the present invention is applied, is very different from the structure of the liquid crystal display devices disclosed in the above-described Japanese Published Unexamined Patent Application Nos. 2009-168878 and 2003-207796.

FIG. 11 shows a structure where the number of layers is small and the number of photolithographic processes is small. This is an excellent structure in view of manufacturing cost. On the other hand, when added capacitance is formed between the pixel electrode 101 and the common electrode 111 to suppress voltage shift due to variation of gate voltage in the TFT, it is difficult to increase the added capacitance.

That is, in FIG. 11, the added capacitance is formed between the pixel electrode 101 and the common electrode 111, and the gate insulating film 103 and the inorganic passivation film 109 exist between the pixel electrode 101 and the common electrode 111. The gate insulating film 103, having a thickness of about 240 nm, and the inorganic passivation film 109, having a thickness of about 500 nm, are both formed with SIN. In this manner, since the added capacitance is formed via the insulating film having the total thickness of 740 nm, the added capacitance cannot be sufficiently increased. Accordingly, there is a problem of influence on the pixel voltage based on the ON/OFF of the gate voltage.

SUMMARY OF THE INVENTION

The present invention has been made so as to address the above-described problem and realize a low-cost IPS liquid crystal display device with a reduced the number of layers of laminated layer film and reduced pixel voltage shift.

According to the first aspect of the present invention, the foregoing object is attained by providing a liquid crystal display device having a TFT substrate, an opposite substrate, and a liquid crystal held between the TFT substrate and the opposite substrate, wherein in the TFT substrate, a scan line extends in a first direction and arranged in a second direction, a video signal line extends in the second direction and arranged in the first direction, and a pixel is formed between the scan line and the video signal line, wherein a pixel electrode is formed on the TFT substrate, a gate insulating film is formed on the pixel electrode, an inorganic passivation film is formed on the gate insulating film, a common electrode having a slit is formed on the inorganic passivation film, the liquid crystal is driven by supply of a video signal to the pixel electrode, wherein a capacitive electrode formed of metal or alloy is formed on the gate insulating film and under the inorganic passivation film, to be opposite to the pixel electrode, and wherein the pixel electrode is connected to the TFT, the capacitive electrode is connected to the common electrode, and the capacitive electrode and the pixel electrode form added capacitance.

In accordance with the present invention as described above, the pixel arrangement may be an in-line arrangement in a vertical direction of the screen or may be a delta arrangement.

According to the second aspect of the present invention, there is provided a liquid crystal display device having a TFT substrate, an opposite substrate, and a liquid crystal held between the TFT substrate and the opposite substrate, wherein in the TFT substrate, a pair of scan lines having a first scan line and a second scan line extends in a first direction and arranged in a second direction, a video signal line extends in the second direction and arranged in the first direction, and a first pixel and a second pixel are formed in the first direction between the pair of scan lines and the video signal line, wherein the first pixel is driven with the first scan line, and the second pixel is driven with the second scan line, wherein a first TFT is formed in correspondence with the first pixel, and a second TFT is formed in correspondence with the second pixel, wherein in the first pixel and the second pixel, a first pixel electrode and a second pixel electrode are respectively formed on the TFT substrate, a gate insulating film is formed on the pixel electrode, an inorganic passivation film is formed on the gate insulating film, a common electrode having a slit is formed on the inorganic passivation film, and the liquid crystal is driven by supply of a video signal to the pixel electrode, wherein a first capacitive electrode formed of metal or alloy is formed on the gate insulating film and under the inorganic passivation film, to be opposite to the first pixel electrode, wherein a second capacitive electrode formed of metal or alloy is formed on the gate insulating film and under the inorganic passivation film, to be opposite to the second pixel electrode, wherein the first capacitive electrode is connected to the common electrode, to form first added capacitance with the first capacitive electrode and the first pixel electrode, and wherein the second capacitive electrode is connected to the common electrode, and the second capacitive electrode and the second pixel electrode form second added capacitance.

In accordance with the present invention as described above, the first pixel and the second pixel may be in an in-line arrangement in the second direction of the screen or may be in a delta arrangement. Further, the first capacitive electrode and the second capacitive electrode may be a serial electrode.

According to the present invention, in an IPS liquid crystal display device with a reduced number of layers, as the added capacitance can be increased, the variation of pixel electrode potential due to variation of the gate voltage can be suppressed.

DETAILED DESCRIPTION OF THE PREFERRED EMBODIMENTS

Preferred embodiments of the present invention will now be described in detail in accordance with the accompanying drawings.

First Embodiment

Figure 1:
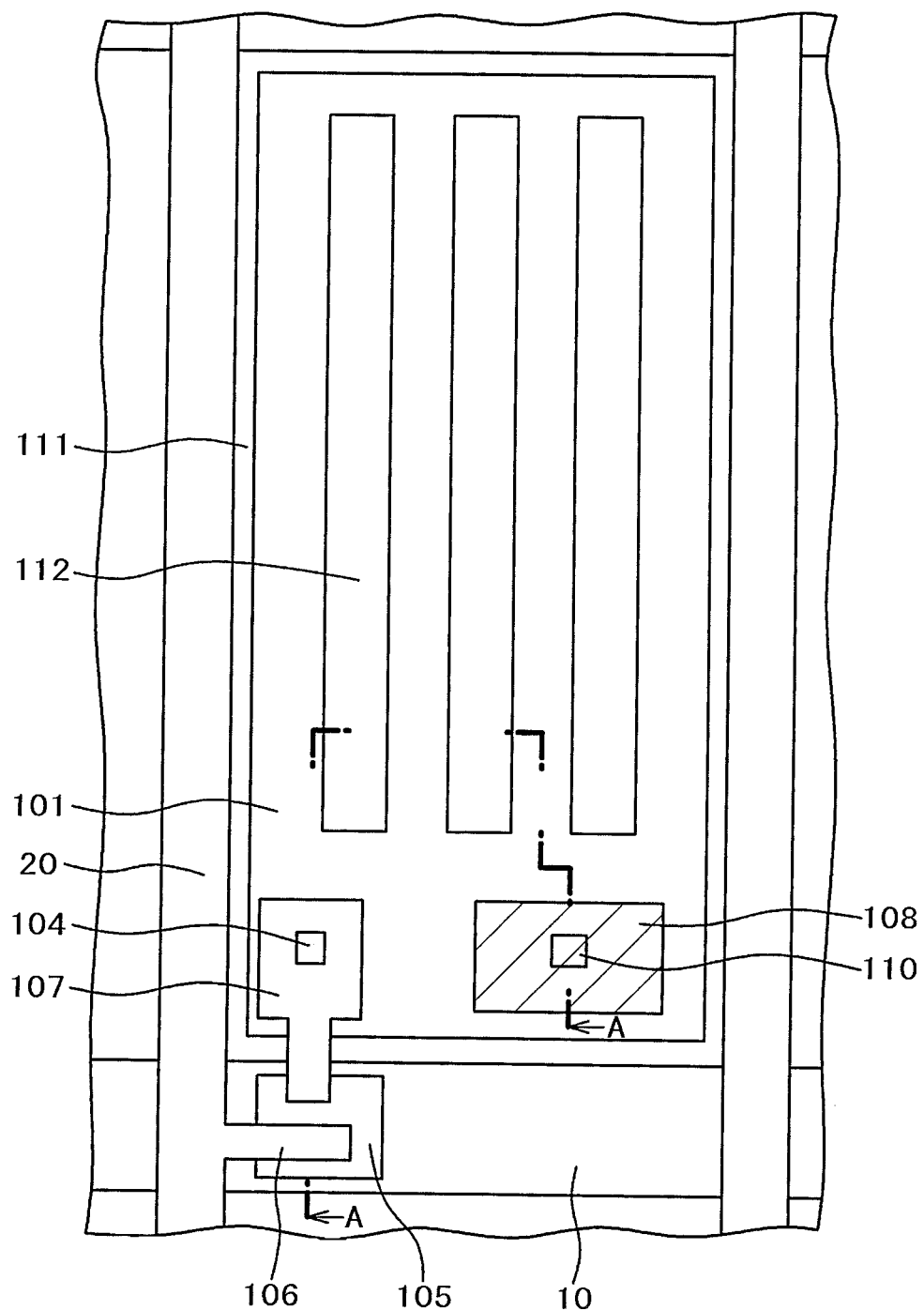
FIG. 1 is a plan view of a pixel in a liquid crystal display device according to the present invention.
Figure 2:
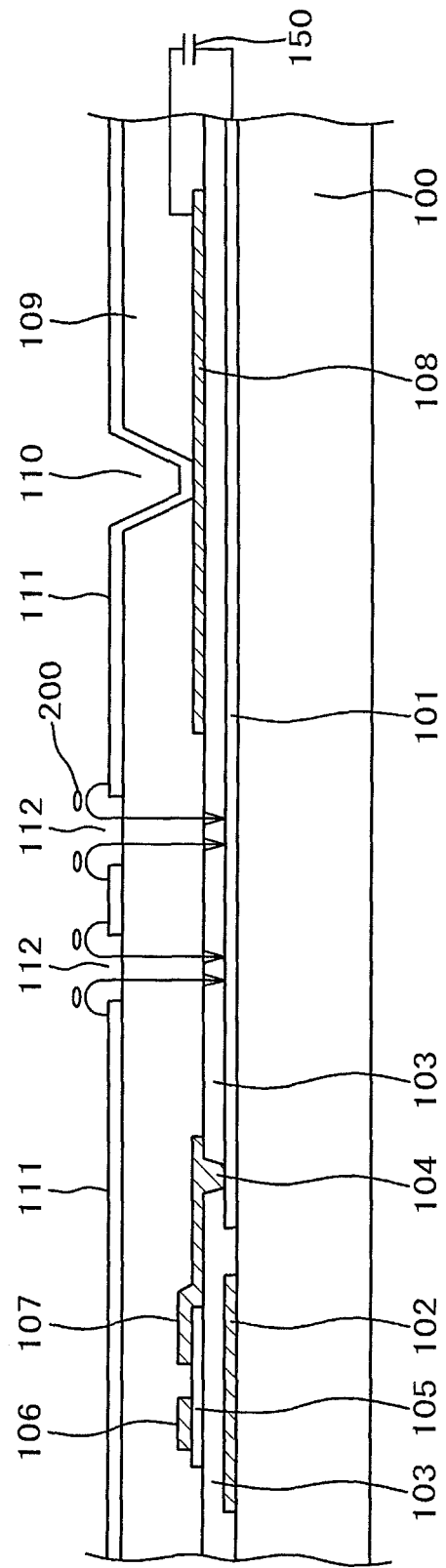
FIG. 2 is a cross-sectional view of the pixel in the liquid crystal display device according to the present invention.

FIG. 1 is a plan view of a pixel part in a liquid crystal display device according to the present invention. Basically, the pixel structure is the same as that described in FIG. 10. That is, the gate insulating film 103 shown in FIG. 2 is formed on the main scan line 10 which also serves as a gate electrode, then the semiconductor film 105 is formed on the gate insulating film, and the drain electrode 106 and the source electrode 107 branched from the video signal line 20 are formed on the semiconductor film. The source electrode 107 is connected to the pixel electrode 101 formed in the bottom layer via the first through hole 104.

Figure 10:
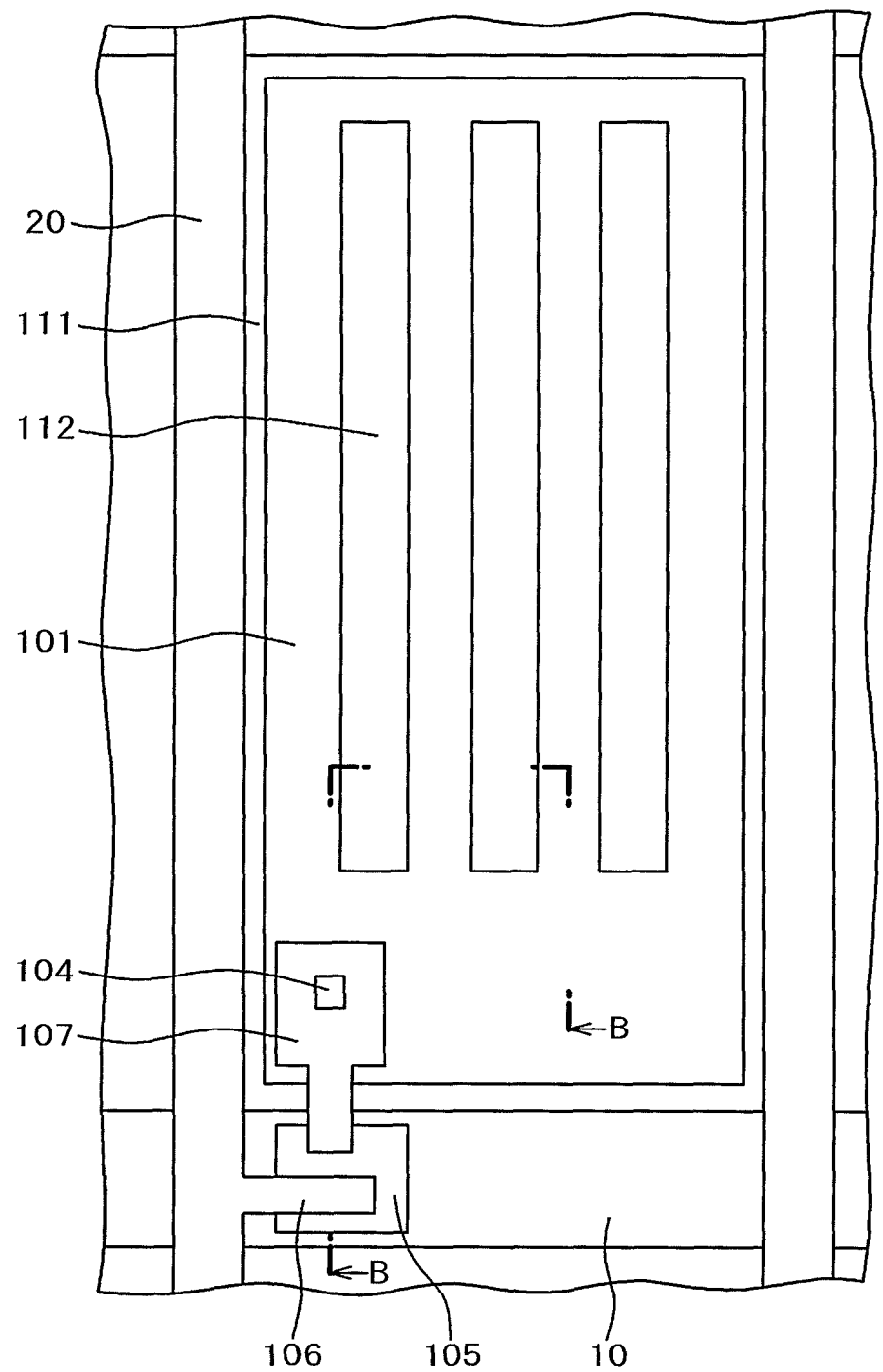
FIG. 10 is a plan view of a pixel in a liquid crystal display device according to a conventional technique.

The inorganic passivation film 109 shown in FIG. 2 is formed to cover the source electrode 107 and the drain electrode 106, and the common electrode 111 is formed on the passivation film. The common electrode 111 has the slit 112. The common electrode 111 covers the entire surface in FIG. 1 except the slit. The difference of FIG. 1 from FIG. 10 is that the capacitive electrode 108 is formed on the gate insulating film 103. The capacitive electrode 108 is connected to the common electrode 111 via the second through hole 110 formed in the inorganic passivation film 109. The capacitive electrode 108 is opposite to the pixel electrode 101 via the gate insulating film 103, and forms the added capacitance 150.

Figure 3:
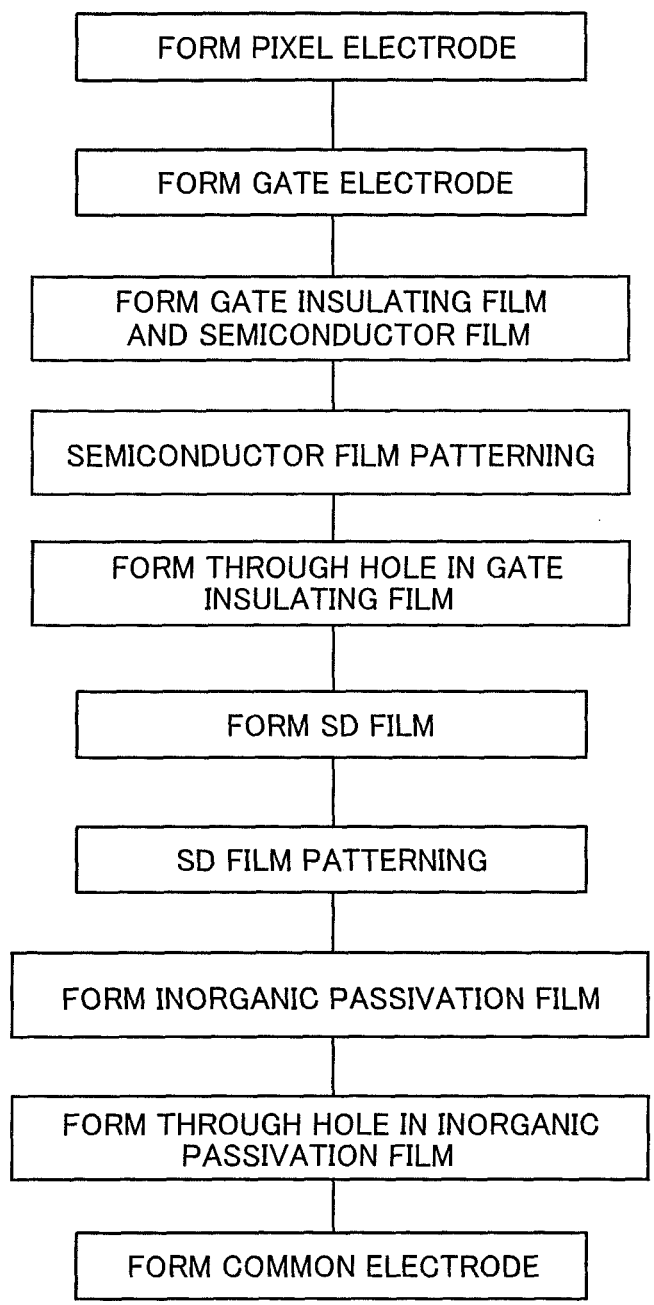
FIG. 3 is a flowchart showing a manufacturing process of the liquid crystal display device according to the present invention.

FIG. 2 is an A-A cross section of FIG. 1. FIG. 3 is a process diagram corresponding to FIG. 2. Next, FIG. 2 will be described with reference to FIG. 3. First, the pixel electrode 101 is formed on the TFT substrate 100. The pixel electrode 101 is formed by sputtering an ITO to have a thickness of e.g. 77 nm or 50 nm. Then the pixel electrode 101 is subjected to patterning. Next, the gate electrode 102 is formed by sputtering to have a thickness of about 220 nm. The gate electrode 102 is e.g. a laminated film in which a lower layer is an Al film having a thickness of 200 nm, and an upper layer is an AlMo alloy having a thickness of about 20 nm. In this manner, the pixel electrode 101 and the gate electrode 102 in the same layer are formed on the TFT substrate 100.

Next, an a-Si film as the gate insulating film 103 and the semiconductor film 105 is continuously formed by CVD. Note that at this time, an n+a-Si (not shown) layer for ohmic contact is formed continuously from the a-Si. The thickness of the gate insulating film 103 is about 350 nm; that of the a-Si film is 150 nm; and that of the n+a-Si layer, about 50 nm.

Figure 4:
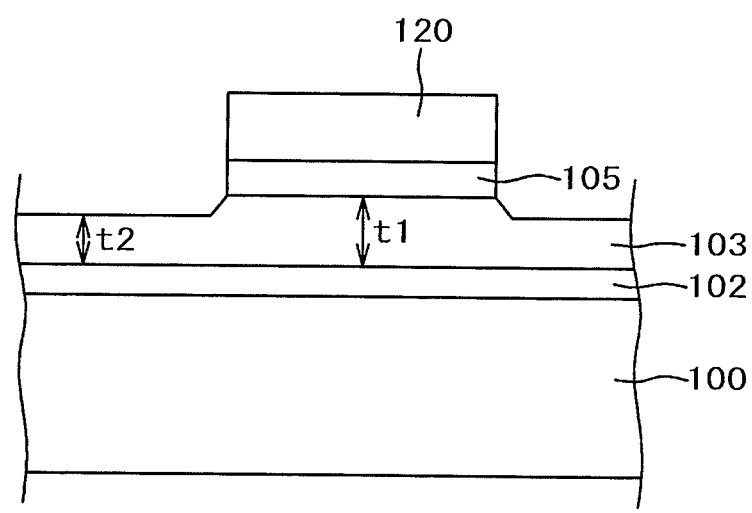
FIG. 4 is a cross-sectional view schematically showing a semiconductor film patterning state.

Next, patterning is performed so as to form the semiconductor film 105 in an island shape as shown in FIG. 1. The semiconductor film 105 is formed on the gate insulating film 103, and the patterning of the semiconductor layer is performed by photolithography. FIG. 4 shows a state prior to formation of resist 120 on the semiconductor film 105 and etching to remove the resist 120. Since the etchant for the semiconductor film 105 somewhat etches the gate insulating film 103, a thickness t2 of the gate insulating film 103 is thinner than a thickness t1 of the gate insulating film 103 under the semiconductor film 105, as shown in FIG. 4.

The difference between the thickness t1 and the thickness t2 can be controlled in accordance with an etching condition. The thickness t1 of the gate insulating film 103 upon formation by CVD is about 350 nm. As described later, in the present invention, in etching of the semiconductor film 105, the gate insulating film 103 except the TFT part is thinned to e.g. about 240 nm so as to increase the added capacitance 150. With this process, the thickness of the gate insulating film 103 except the TFT part can be controlled to about 200 nm to 300 nm. Thereafter, the first through hole 104 is formed in the gate insulating film 103. The TFT source electrode 107 and the pixel electrode 101 can be connected via the first through hole 104.

Next, as an SD (source, drain) film, a CrMo film is formed by sputtering to have a thickness of about 150 nm to 200 nm. Then the SD film is subjected to patterning. In the middle of the patterning of the SD film, etching is performed on a channel part of the TFT so as to remove n+a-Si in this part. Note that the SD film is not limited to CrMo but another metal or alloy may be used.

In the present invention, the SD film is used as not only the TFT source electrode 107 and the drain electrode 106, but also as the capacitive electrode 108 for the added capacitance 150 as shown in FIG. 2. That is, when the source electrode 107 and the drain electrode 106 are formed, the capacitive electrode 108 is formed at the same time. As shown in FIG. 2, the capacitive electrode 108 is opposite to the pixel electrode 101, with the gate insulating film 103 thinned in the patterning of the semiconductor film 105 therebetween.

Thereafter, the inorganic passivation film 109 is formed by CVD. The inorganic passivation film 109 is formed with e.g. SiN to have a thickness of about 500 nm. It is necessary to have a predetermined or thicker film thickness to have a function of a passivation film. Then, a second through hole 110 is formed in the inorganic passivation film 109.

Next, the common electrode 111 is formed. As in the case of the pixel electrode 101, the common electrode 111 is formed by sputtering ITO to have a thickness of e.g. 77 nm or 50 nm. At this time, the common electrode 111 and the capacitive electrode 108 are connected via the second through hole 110 formed in the inorganic passivation film 109. Next, patterning is performed on the common electrode 111 formed on the entire surface. As shown in FIG. 1 or 2, the patterning of the common electrode 111 is made by forming the slit 112 with respect to the common electrode 111. Accordingly, after the patterning of the common electrode 111, the common electrode 111 exists on the entire surface except the slit part.

When a voltage is applied between the pixel electrode 101 and the common electrode 111, an electric line of force as shown in FIG. 2 occurs, to rotate the liquid crystal molecule 200. This controls the quantity of light passing through the liquid crystal layer by pixel, to form an image. Note that in FIG. 2, an orientation film to initially orient the liquid crystal formed on the common electrode 111 is omitted. Further, an opposite substrate (not shown) on which color filters and the like are formed, is provided to be opposite to the TFT substrate 100 in FIG. 2, with the liquid crystal layer therebetween.

Figure 11:
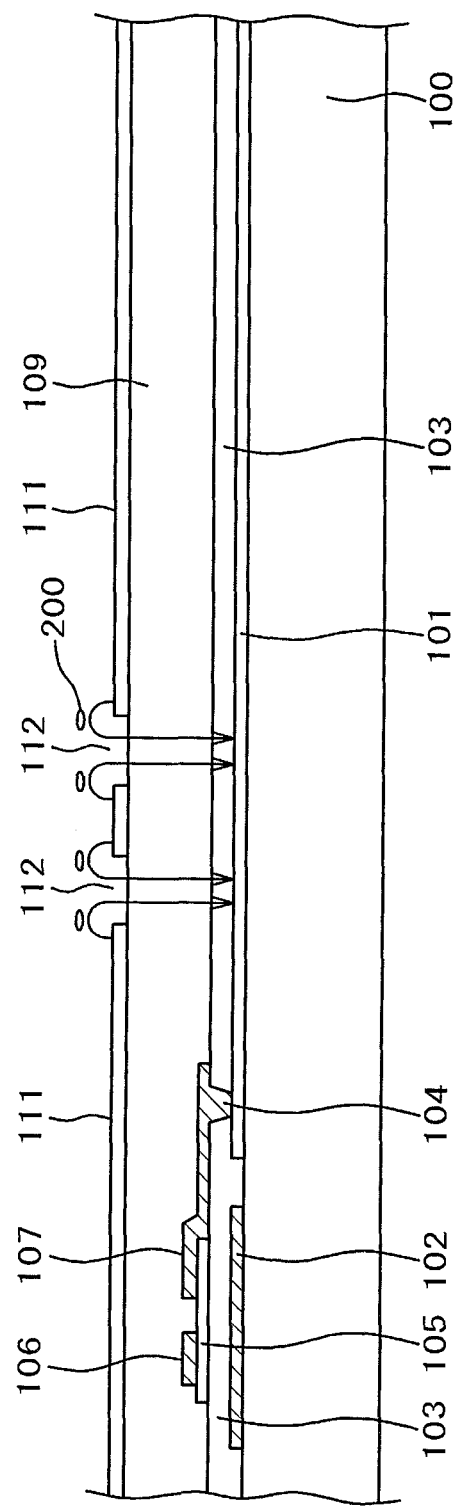
FIG. 11 is a cross-sectional view of the pixel in the liquid crystal display device according to the conventional technique.

The characteristic feature of the present invention is that it is possible to form the added capacitance 150 between the gate insulating film 103 and the pixel electrode 101 as shown in FIG. 2. In a case where the present invention is not used, the capacitance formed between the common electrode 111 and the pixel electrode 101 is formed, with the gate insulating film 103 and the inorganic passivation film 109 therebetween, as shown in FIG. 11. In this arrangement, it is not possible to obtain large added capacitance. In the present invention, in addition to the conventional added capacitance, the added capacitance 150 shown in FIG. 2 is added. Accordingly, it is possible to form large added capacitance as a whole and to reduce the influence on pixel voltage due to the variation of the gate voltage.

Figure 5:
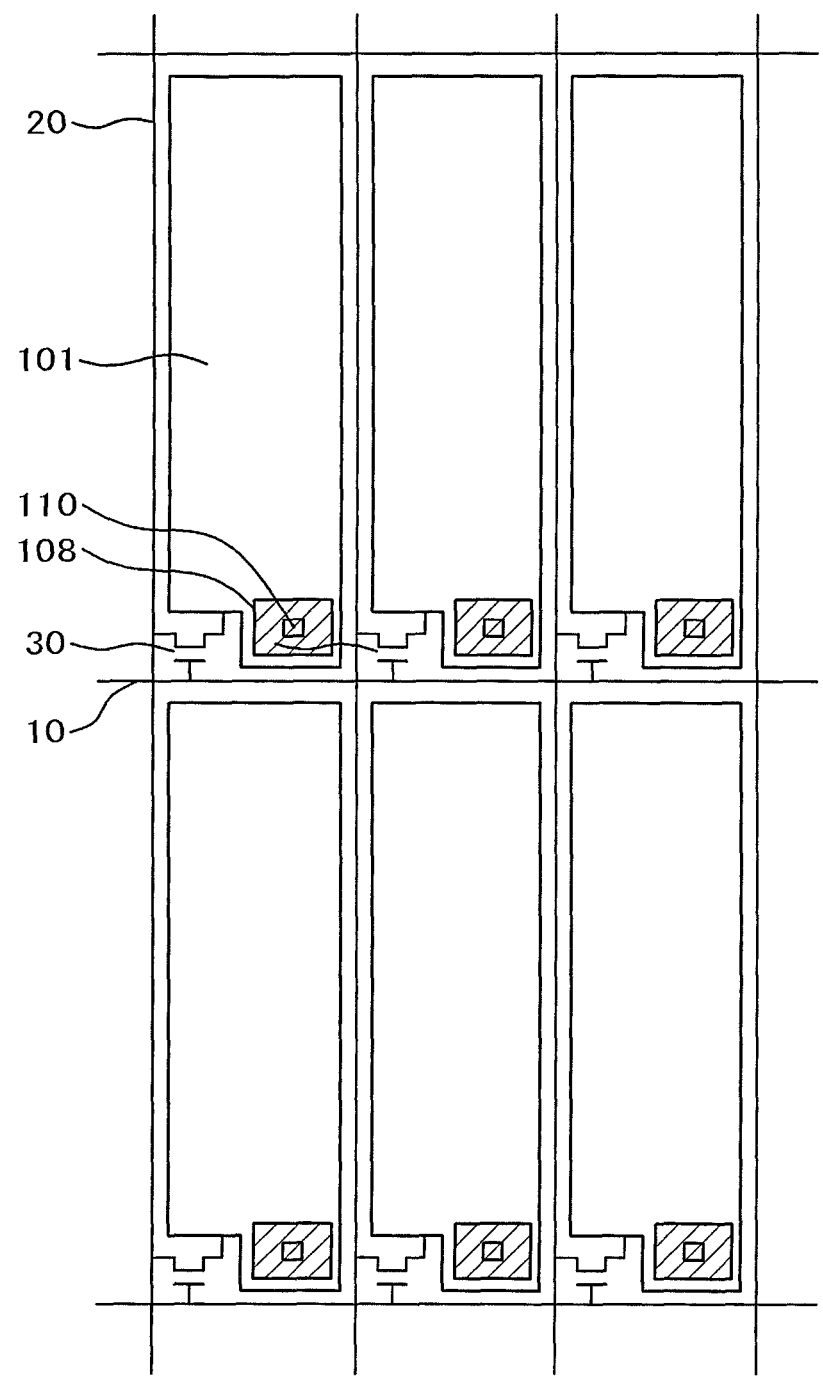
FIG. 5 illustrates a pixel arrangement in a first embodiment.

FIG. 5 illustrates an example of arrangement of the pixel in FIG. 1 described as above in matrix. In FIG. 5, to avoid complication of illustration, the common electrode 111 is omitted, and the TFT 30 is shown as a sign. In FIG. 5, the gate electrode 102 of the TFT 30 is connected to the main scan line 10, and the drain electrode 106 is connected to the video signal line 20. The capacitive electrode 108 forming the added capacitance 150 overlaps the pixel electrode 101 under the pixel. The second through hole 110 connected to the common electrode 111 (not shown) is provided on the capacitive electrode 108. Thus the added capacitance 150 is formed in each pixel.

FIG. 5 shows an example where the pixels are in-line arranged in the vertical direction. However, the present invention is also applicable to a so-called delta arrangement of the pixels. That is, in the delta arrangement (although not shown here), the position of a pixel is moved in the horizontal direction by half of the lateral dimension of the pixel per line. In this case, the video signal line 20 is bended per pixel line.

Second Embodiment

Figure 6:
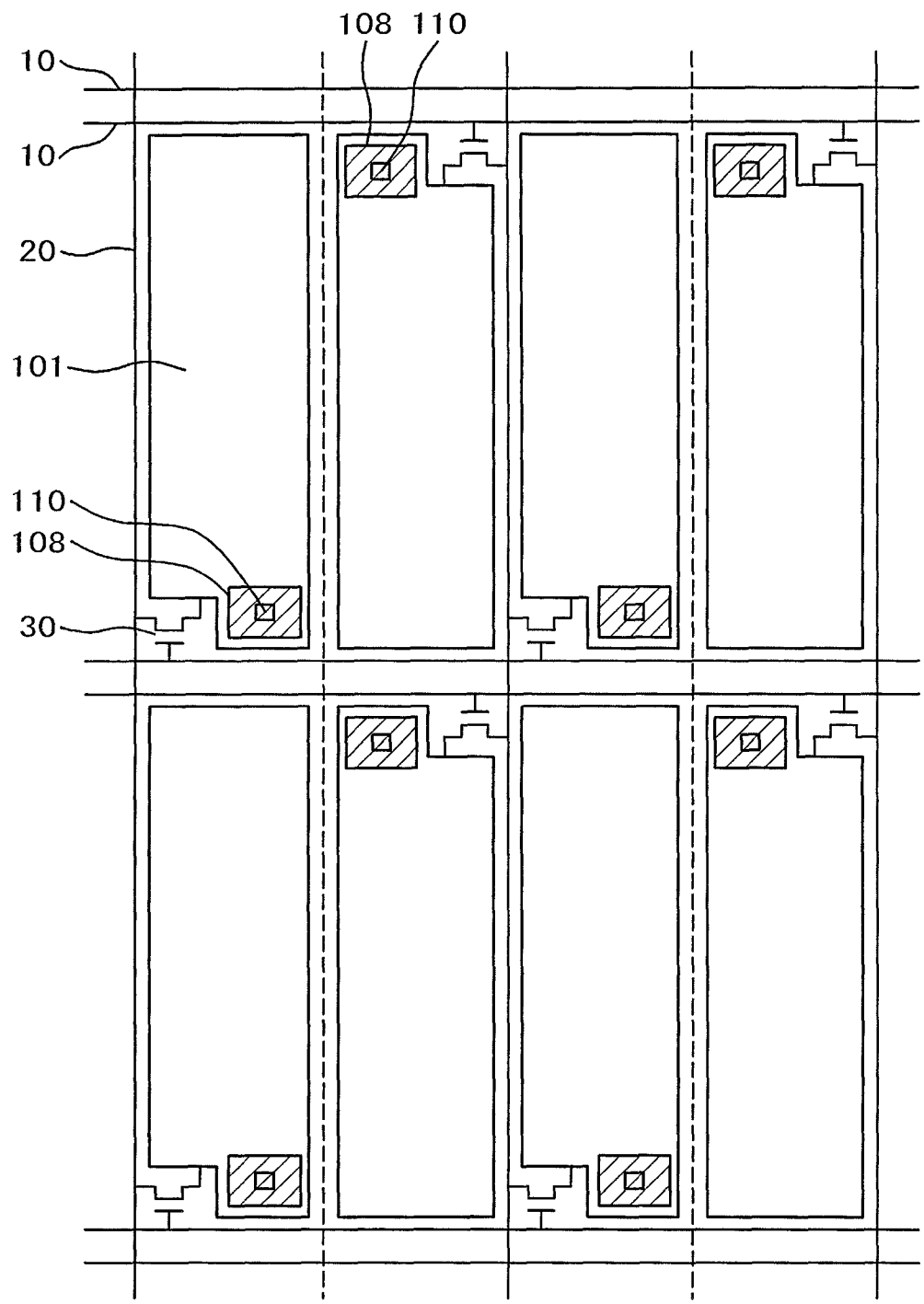
FIG. 6 illustrates a pixel arrangement in a second embodiment.

FIG. 5 shows a generally used pixel arrangement. In FIG. 5, the video signal lines 20 exist in correspondence with the number of pixels in the horizontal direction. The required number of IC pins is the number of video signal lines 20. The cost of the IC is greatly influenced by the number of pins. FIG. 6 shows a driving method in which the number of video signal lines 20 can be reduced to half the number of pixels in the horizontal direction.

In FIG. 6, a pair of main scan lines 10 extends in the horizontal direction. The TFT 30 to supply the video signal alternately to the pixels arrayed in the horizontal direction is driven with the pair of the main scan lines 10. The first pixel is driven with the upper main scan line 10, and the second pixel is driven with the lower main scan line 10. That is, one horizontal scan period is divided into two periods. In the first half period, the video signal is written with respect to the first pixel, and in the second half period, the video signal is written with respect to the second pixel.

In this method, the time to write the video signal with respect to each pixel is reduced to half. Further, the number of the main scan lines 10 is increased to double of that in a normal case. However, since the number of the main scan lines 10 is equal to or less than ⅓ of the number of the video signal lines 20, the merit that the number of the video signal lines 20 becomes half is advantageous in the IC cost reduction. In the structure shown in FIG. 6, the added capacitance 150 can be formed as in the case of the first embodiment. In the present embodiment, the position of the added capacitance 150 is reversed to its adjacent capacitance, although there is no problem in the characteristic.

Third Embodiment

Figure 7:
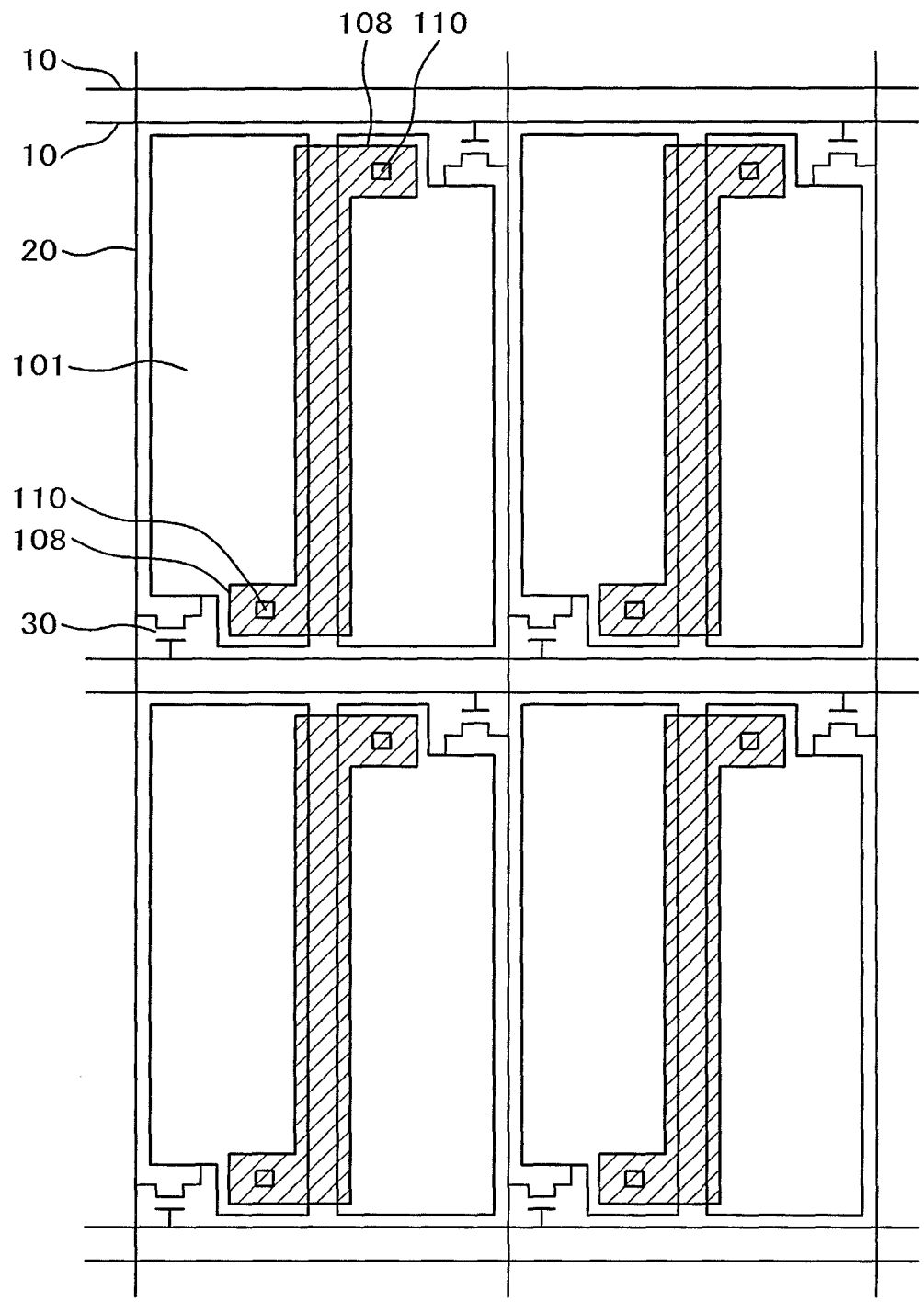
FIG. 7 illustrates a pixel arrangement in a third embodiment.

FIG. 7 illustrates a pixel arrangement in a third embodiment of the present invention. The pixel driving method in FIG. 7 is the same as that described in FIG. 6, having the merit that the number of the video signal lines 20 can be reduced to half. The characteristic feature in FIG. 7 is that it is possible to form the capacitive electrode 108 between adjacent pixels where no video signal line 20 exists and to further increase the added capacitance 150.

In FIG. 7, a shielding film is formed on the opposite substrate side so as to prevent light leakage even between pixels without the video signal line 20. Accordingly, even when the capacitive electrode 108 is formed for the added capacitance 150 in this portion, the transmittance is not lowered. In FIG. 7, the capacitive electrode 108 which overlaps the each pixel electrode 101 is formed between the adjacent first pixel and second pixel without the video signal line 20 therebetween.

In FIG. 7, in the capacitive electrode 108, the second through hole 110 connecting the common electrode 111 (not shown) to the capacitive electrode 108 is formed in the first pixel and the second pixel. It is not necessary to provide the through hole in the pixel, but may be provided between the first pixel and second pixel. Further, in FIG. 7, the capacitive electrode 108 between the adjacent first pixel and second pixel is continuous, but it may be separated as needed.

Fourth Embodiment

In a Digital Still Camera (DSC) or the like, to increase the resolution, the pixel arrangement may be a delta arrangement. In the delta arrangement, it is advantageous to arrange the video signal line 20 alternately per pixel. In the DSC or the like, to raise the resolution, the number of the video signal lines 20 is increased, while, since the size of pixel is small, the video signal writing period is short.

Figure 8:
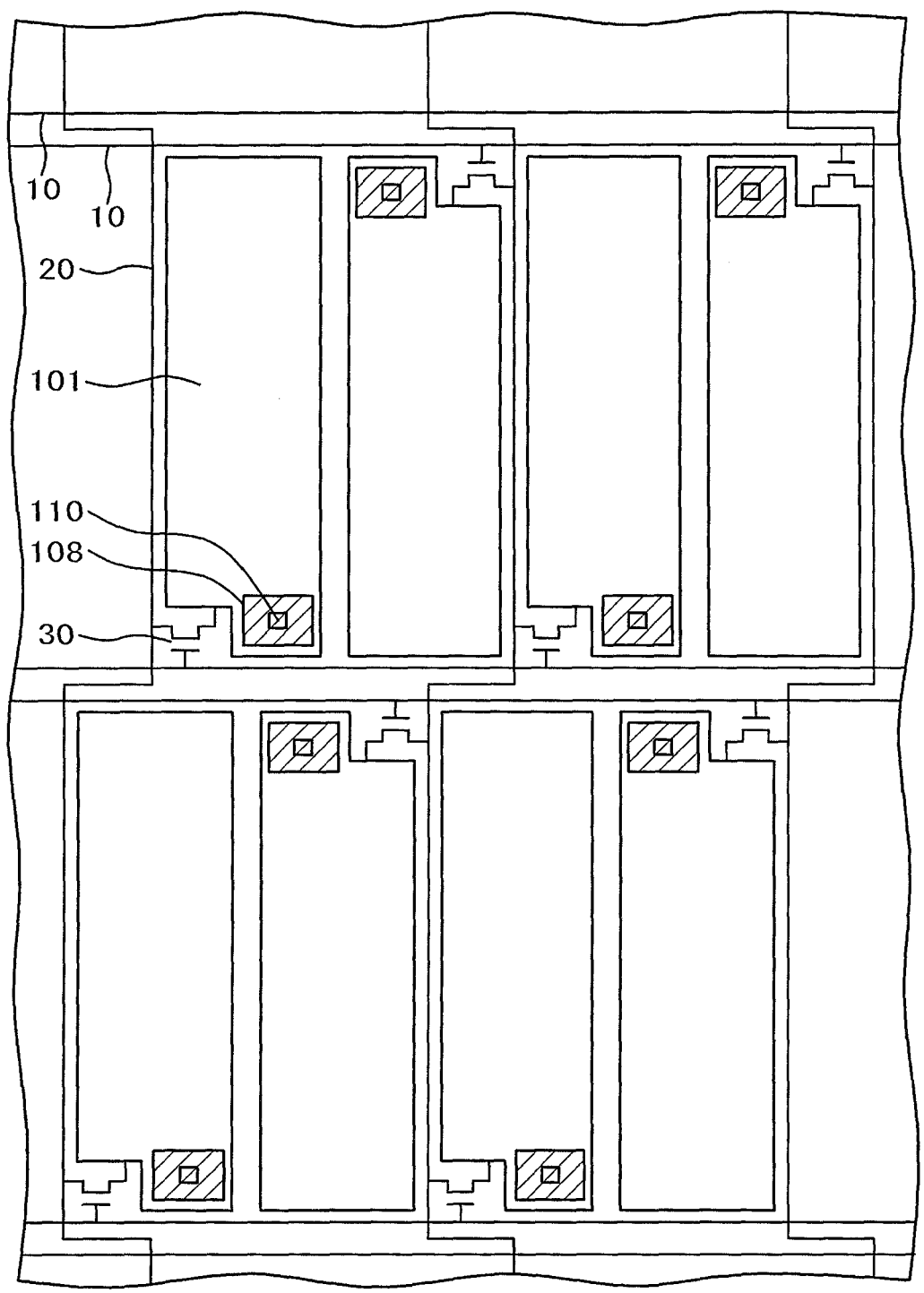
FIG. 8 illustrates a pixel arrangement in a fourth embodiment.

FIG. 8 illustrates an example where the pixels are in the delta arrangement, and the video signal line 20 is arranged alternately per pixel in the horizontal direction. The arrangement in FIG. 8 is the same as that described in FIG. 6 except that the pixels are in the delta arrangement. Note that in FIG. 8, for the delta arrangement of the pixels, the video signal line 20 is bended. The two main scan lines 10 in pair extend in the horizontal direction and the capacitive electrode 108 overlaps the pixel electrode 101, as in the case of FIG. 6.

Fifth Embodiment

Figure 9:
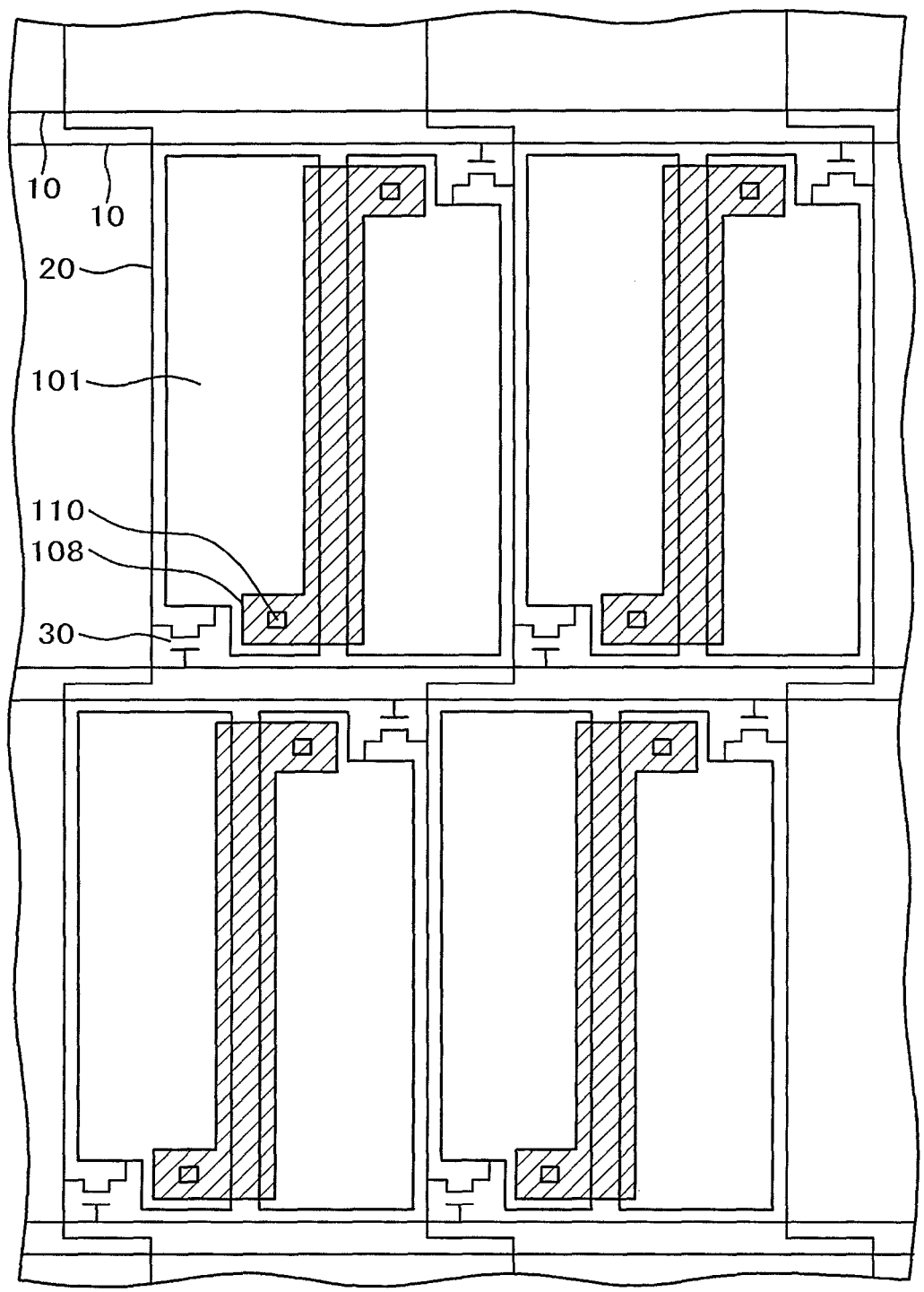
FIG. 9 illustrates a pixel arrangement in a fifth embodiment.

FIG. 9 illustrates a pixel arrangement in a fifth embodiment of the present invention. In FIG. 9, the pixel arrangement and driving method are the same as those in the fourth embodiment. The characteristic feature in FIG. 9 is that the capacitive electrode 108 is formed even between adjacent pixels without the video signal line 20, and with this arrangement, the added capacitance 150 is further increased. The arrangement and advantageous point obtained with the capacitive electrode 108 are the same as those in FIG. 7 in the third embodiment.

In the delta arrangement, similarly to the third embodiment, a shielding film is formed on the opposite substrate side so as to prevent light leakage even between pixels without the video signal line 20. Accordingly, even when the capacitive electrode 108 is formed for the added capacitance 150 in this portion, the transmittance is not decreased. In FIG. 9, the capacitive electrode 108 which overlaps each pixel electrode 101 is formed between the adjacent first and second pixels without the video signal line 20.

In FIG. 9, the second through hole 110 connecting the common electrode 111 (not shown) to the capacitive electrode 108 is formed in the first and second pixels in the capacitive electrode 108. The through hole is not necessarily provided in the pixel but may be provided between the first and second pixels. Further, in FIG. 9, the capacitive electrode 108 between the adjacent first and second pixels is continuous, but it may be separated as needed.

As described above, in the IPS method with reduced number of layers, the variation of pixel potential due to ON/OFF of the gate voltage can be suppressed by applying the present invention to the delta arrangement pixel structure.

In the present invention, it is necessary to form the first through hole 104 in the gate insulating film 103 and form the second through hole in the inorganic passivation film 109. In the inorganic passivation film 109, however, since a through hole is formed for formation of a terminal, the second through hole 110 can be formed at the same time of the formation of the terminal through hole. Further, in the gate insulating film 103, since a through hole is often formed for formation of terminal, the first through hole 104 can be formed at the same time of the sputtering of terminal portion. Further, when the main scan line 10 driving circuit is included, since it is necessary to form a through hole in the gate insulating film 103, the first through hole 104 can be formed simultaneously at this time.

What is claimed is:

1. A liquid crystal display device having a TFT substrate, an opposite substrate, and a liquid crystal between the TFT substrate and the opposite substrate;
    wherein in the TFT substrate, there are formed in the following order;
    a first pixel electrode and a second pixel electrode, a first scan line and a second scan line which extend in a first direction and are arranged in a second direction;
    a first insulating film;
    a first video signal line and a second video signal line which extend in the second direction and are arranged in the first direction;

a second insulating film; and a common electrode;

wherein the first pixel electrode and the second pixel electrode are formed in an area surrounded by the first scan line, the second scan line, the first video signal line and the second video signal line;

wherein the first video signal is supplied to the first pixel electrode through a first TFT driven by the first scan line, the second video signal is supplied to the second pixel electrode through a second TFT driven by the second scan line;

wherein the first pixel electrode and the second pixel electrode overlap with the common electrode;

wherein the liquid crystal is driven by an electric field formed between the common electrode and each of the first pixel electrode and the second pixel electrode;

wherein each of the first pixel electrode and the second pixel electrode forms an added capacitance with a capacitive electrode formed by a metal or an alloy via the first insulating film; and wherein the capacitive electrode is electrically connected to the common electrode which is set between the first pixel electrode and the second pixel electrode in plan view, and overlaps with an edge of the first pixel electrode and an edge of the second pixel electrode.

2. A liquid crystal display device according to claim 1,

Wherein the first pixel electrode and the second pixel electrode are arranged in an in-line arrangement in the second direction.

3. A liquid crystal display device according to claim 1, wherein the first pixel electrode and the second pixel electrode are arranged in a delta arrangement.

\* \* \* \* \*